(12) United States Patent
Klosinski

(10) Patent No.: US 7,765,873 B2
(45) Date of Patent: Aug. 3, 2010

(54) PRESSURE DIAGNOSTIC FOR ROTARY EQUIPMENT

(75) Inventor: Andrew Jurli Klosinski, Waconia, MN (US)

(73) Assignee: Rosemount Inc., Eden Prairie, MN (US)

( * ) Notice: Subject to any disclaimer, the term of this patent is extended or adjusted under 35 U.S.C. 154(b) by 0 days.

(21) Appl. No.: 12/218,805

(22) Filed: Jul. 18, 2008

(65) Prior Publication Data

US 2009/0019938 A1   Jan. 22, 2009

Related U.S. Application Data

(60) Provisional application No. 60/961,540, filed on Jul. 20, 2007.

(51) Int. Cl.
    *G01L 7/00* (2006.01)
(52) U.S. Cl. ....................................................... 73/714
(58) Field of Classification Search .................. None
    See application file for complete search history.

(56) References Cited

U.S. PATENT DOCUMENTS

| | | |
|---|---|---|
| 4,654,813 A | 3/1987 | Edlund et al. |
| 5,209,258 A | 5/1993 | Sharp et al. |
| 5,420,578 A | 5/1995 | O'Brien et al. |
| 5,481,924 A | 1/1996 | Sparks et al. |
| 5,560,550 A | 10/1996 | Krawczyk |
| 5,956,663 A | 9/1999 | Eryurek |
| 6,017,143 A | 1/2000 | Eryurek et al. |
| 6,047,220 A | 4/2000 | Eryurek |
| 6,119,047 A | 9/2000 | Eryurek et al. |
| 6,213,711 B1 | 4/2001 | Muller et al. |
| 6,397,114 B1 | 5/2002 | Eryurek et al. |
| 6,532,392 B1 | 3/2003 | Eryurek et al. |
| 6,539,267 B1 | 3/2003 | Eryurek et al. |
| 6,543,227 B2 | 4/2003 | He et al. |
| 6,601,005 B1 | 7/2003 | Eryurek et al. |
| 6,654,697 B1 | 11/2003 | Eryurek et al. |
| 6,663,353 B2 | 12/2003 | Lipscomb et al. |
| 6,754,601 B1 | 6/2004 | Eryurek et al. |
| 6,907,383 B2 | 6/2005 | Eryurek et al. |
| 7,010,459 B2 | 3/2006 | Eryurek et al. |
| 7,079,984 B2 | 7/2006 | Eryurek et al. |
| 7,085,610 B2 | 8/2006 | Eryurek et al. |
| 7,181,654 B2 | 2/2007 | Ford, Jr. et al. |
| 7,254,518 B2 | 8/2007 | Eryurek et al. |
| 7,389,204 B2 | 6/2008 | Eryurek et al. |
| 2003/0061004 A1 | 3/2003 | Discenzo |
| 2004/0267395 A1 | 12/2004 | Discenzo et al. |
| 2005/0173112 A1 | 8/2005 | Kavaklioglu et al. |

(Continued)

OTHER PUBLICATIONS

Durke et al. An Assessment of Technology for Correcting Pulsation-Induced Orifice Flow Measurement. Southwest Research Institute, Report No. TA 91-1, Nov. 1991.

Sparks et al. Square Root Error Indicator Gage Line Effects. Southwest Research Institute, Technical Note, Apr. 1996.

Bell. Lost & Unaccounted Natural Gas: The Effect and Control of Pulsation in Natural Gas Measurement. PGI International, Houston, Texas; 1991.

(Continued)

*Primary Examiner*—Andre J Allen
(74) *Attorney, Agent, or Firm*—Kinney & Lange, P.A.

(57) ABSTRACT

A system comprises a rotary machine, a sensor and a processor. The rotary machine has a component that operates on a fluid. The sensor senses pressure in the fluid. The processor generates a diagnostic indicative of wear on the component, based on process noise on the pressure.

25 Claims, 7 Drawing Sheets

U.S. PATENT DOCUMENTS

| | | |
|---|---|---|
| 2005/0197806 A1 | 9/2005 | Eryurek et al. |
| 2005/0229716 A1 | 10/2005 | Unsworth et al. |
| 2005/0267710 A1 | 12/2005 | Heavner, III et al. |
| 2006/0036404 A1 | 2/2006 | Wiklund et al. |
| 2006/0277000 A1 | 12/2006 | Wehrs |
| 2007/0010900 A1 | 1/2007 | Kavaklioglu et al. |
| 2007/0069903 A1 | 3/2007 | Wehrs et al. |
| 2007/0088528 A1 | 4/2007 | Miller |
| 2007/0163362 A1 | 7/2007 | Wehrs et al. |
| 2008/0027678 A1 | 1/2008 | Miller |
| 2008/0082181 A1 | 4/2008 | Miller et al. |
| 2008/0082294 A1 | 4/2008 | Pihlaja et al. |

OTHER PUBLICATIONS

Bell, Sr. Effects and Control of Pulsation in Gas Measurement. PGI International, Houston, Texas; 1991.

Durke et al. Orifice Meter Gage Line Distortions. Southwest Research Institute; 2002.

Official Search Report and Written Opinion of the International Searching Authority in counterpart foreign Application PCT/US 08/08824 filed Jul. 18, 2008.

PRESSURE DIAGNOSTIC FOR ROTARY EQUIPMENT

CROSS-REFERENCE TO RELATED APPLICATIONS

This application claims priority from Provisional U.S. Patent Application Ser. No. 60/961,540, entitled STEAM TURBINE BLADE WEAR DIAGNOSTIC, by Andrew J. Klosinski et al., filed Jul. 20, 2007.

Reference is made to U.S. patent application Ser. No. 12/218,803 by Andrew J. Klosinski et al., entitled DIFFERENTIAL PRESSURE DIAGNOSTIC FOR PROCESS FLUID PULSATIONS, filed on even date herewith and subject to common assignment.

BACKGROUND

The subject matter of this disclosure relates generally to rotary equipment, and in particular to diagnostic techniques for rotary equipment components. Specifically, the invention concerns a pressure-based diagnostic for monitoring wear on components that operate on a fluid.

Pressure sensors provide utility across a wide range of industrial applications, including bulk fluid storage and transport, agriculture, environmental control, water and air distribution, food and beverage preparation, chemical and pharmaceutical production, and a range of manufacturing processes utilizing thermoplastics, glues, resins and other fluidic materials. Pressure measurements are also important to energy production and other hydrocarbon fuel applications, which involve a wide range of fluidic flows including natural gas, diesel, pulverized coal, water and steam.

Pressure sensing technologies range from simple spring gauges, strain gauges and other mechanical devices to advanced capacitive, piezoresistive and electrochemical sensors. In industrial systems, these are typically housed in a transmitter or other more generalized field device, which protects the sensor hardware and adds higher-order functionality such as signal processing and communications.

The most appropriate pressure measurement methods depend upon the properties of the process material and the demands of each particular processing application. In custody transfer, for example, differential pressure measurements are typically utilized to achieve flow sensitivity via Bernoulli's principle and other velocity-dependent effects. In energy production, gage and absolute pressure measurements are required to provide precision control of large-scale rotary equipment such as blowers, fans, compressors and turbines.

In rotary equipment applications, components that operate on the fluid are often susceptible to wear and tear due to interactions with the flow stream. Wear and tear occurs both gradually, due to blade and vane erosion, and discretely, due to debris impacts and other damage including the loss of a blade or vane, or of individual components such as tips, airfoil sections and thermal coatings.

In order to diagnose these forms of wear and tear, it is necessary to continuously monitor the operational condition of rotary equipment. Dedicated devices such as blade tip sensors and inlet debris sensors are expensive, however, and do not provide measurement functionality outside their particular diagnostic purpose. There is thus a need for diagnostic techniques that combine sensitivity to wear and tear with existing process measurements, and which are applicable across a range of custody transfer, power production, environmental control and other fluid flow applications.

SUMMARY

This disclosure concerns a system and a method for monitoring a rotary machine having a component that operates on a fluid. The system comprises a pressure sensor and a processor. The sensor senses a differential, gage or absolute pressure in the fluid. The processor generates a diagnostic based on variations in the pressure. The diagnostic is indicative of wear on the component, such as erosion or loss of a blade, vane or section thereof.

The method comprises sensing a pressure in fluid, monitoring process noise on the pressure, and generating a wear diagnostic as a function of the process noise. The wear diagnostic is correlated with physical changes in the component, including changes due to wear and tear or other damaging interactions with a fluid flow.

DETAILED DESCRIPTION

Figure 1:
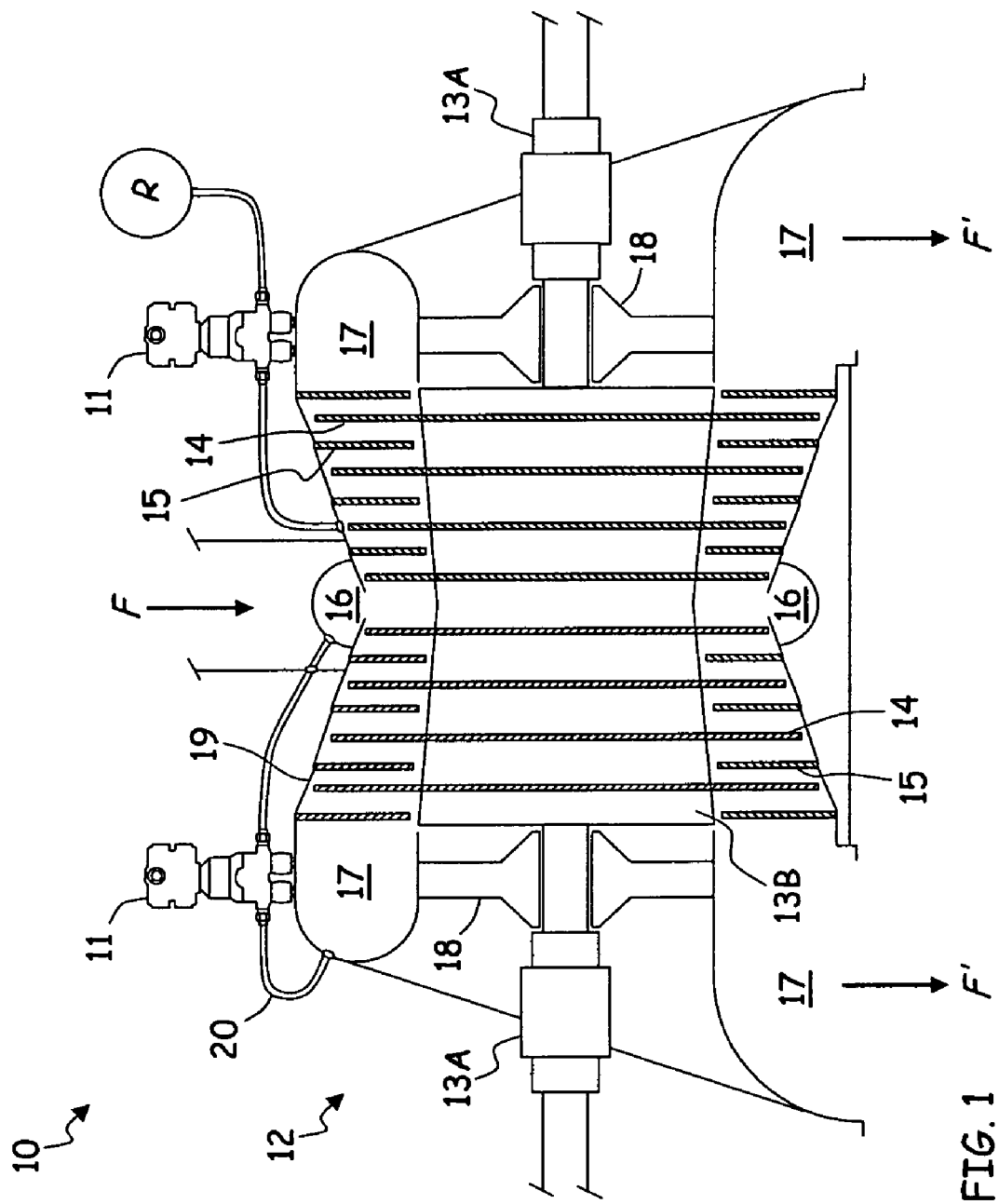
FIG. 1 is a cross-sectional schematic of a pressure-based diagnostic system for rotating machinery.

FIG. 1 is a cross-sectional schematic of pressure-based diagnostic system 10 for rotating machinery. System 10 comprises pressure sensors/transmitters 11 and rotary apparatus 12.

In the particular embodiment of FIG. 1, rotary apparatus 12 comprises a turbine having shaft sections 13A and 13B, blades 14, vanes 15, inlet manifold 16 for incoming fluid flow F and outlet manifolds 17 for outgoing fluid flow F'. Pressure sensors/transmitters 11 are positioned to measure pressure in the fluid flowing through turbine 12, and to generate a wear diagnostic for components of turbine 12 that operate on the fluid.

Output shaft sections 13A and shaft drum section 13B are formed from cylindrical, conical or frusto-conical sections of steel or another durable metal alloy. Output shafts 13A are rotationally supported at bearings 18, and coupled to drum 13B via welding, bolts, machine screws or similar means of mechanical attachment. Drum section 13B is typically a hollow structure with a larger radial dimension than output shaft sections 13A, in order to position blades 14 proximate vanes 15.

Blades 14 and vanes 15 are formed of a durable material such as a high-temperature alloy or superalloy, and often provided with a protective coating such as a ceramic thermal barrier coating (TBC), an aluminide coating, a Nickel-Chromium-Aluminum-Yttrium (NiCrAlY) coating, or a combination thereof. Both blades 14 and vanes 15 typically have airfoil-shaped cross-sectional profiles.

Rotation of shaft drum 13B moves blades 14 past vanes 15. In turbine embodiments, blades 14 and vanes 15 are usually arranged into a number of alternating stages, with blades 14 attached to drum 13B at a root or platform section and vanes 15 similarly attached to turbine/engine case 19.

Inlet manifold 16 is an annular structure oriented about the middle of drum section 13B. Outlet manifolds 17 are similarly arranged about opposite ends of the drum section. In operation of turbine 12, working fluid flows into inlet manifold 16 in both directions along drum 13B, past blades 14 and vanes 15 toward outlet manifolds 17. Blades 14 and vanes 15 are shaped to extract thermal energy from the working fluid as it flows from inlet manifold 16 to outlet manifolds 17, and to convert the thermal energy into rotational energy of motion.

Output shafts 13A deliver the rotational energy to an electrical power generator or other mechanical load, via mechanical coupling to drum section 13B. Outlet manifolds 17 direct the working fluid from turbine 12 to a lower-pressure turbine, a condenser, a heat exchanger, a cooling tower or an exhaust stack, for additional energy extraction or dispersal into the environment.

In the particular embodiment of FIG. 1, turbine 12 is a low-pressure centrifugal turbine, and the working fluid is steam. In this embodiment, water content and impact damage are particular contributors to wear and tear on blades 14 and vanes 15. In other embodiments, the working fluid is higher-pressure steam or superheated steam, in which corrosion and temperature effects are important. In further embodiments, rotary apparatus 12 comprises a more generalized fan, blower, turbine or compressor assembly, as illustrated, for example, by FIGS. 6 and 7 below. In these embodiments, the working fluid comprises any combination of air, steam, coolant, oxidizer, fuel, combustion gas or other fluidic materials, including particulate materials such as pulverized coal or coal ash, in which impacts, erosion, corrosion and temperature change the physical condition of apparatus 12 by wear and tear on its components.

Transmitters 11 comprise pressure sensors positioned to measure pressure in the fluid flowing through rotary apparatus 12, and to monitor pressure variations including process noise in order to diagnose wear and tear on the relevant components. On the left-hand side, for example, pressure sensor/transmitter 11 is positioned to measure a differential pressure (DP) across turbine 12, utilizing impulse tubing or other fluid connections 20 between inlet manifold 16 and outlet manifold 17. In this embodiment, sensor/transmitter 11 operates as a differential pressure (DP) sensor. On the right-hand side, pressure sensor/transmitter 11 is positioned to measure a pressure proximate one of blades 14 of turbine 12, as compared to reference R. In this embodiment, sensor/transmitter 11 operates as either a gage pressure (GP) sensor (when reference R is an atmospheric pressure reference) or an absolute pressure (AP) sensor (when reference R is a vacuum pressure reference).

As fluid flows across blades 14 and vanes 15, blades 14 and vanes 15 are subject to wear and tear effects that change component geometry, including erosion, pitting, corrosion, impacts and the liberation of blade or vane elements such as coatings, blade tips and other pieces of the airfoil. Blades 14 are also subject to mechanical stresses and strains due to the rotation of drum 13B, which can result in g-forces of several thousand or more and can cause deformation or additional liberation events. Changes in the blade geometry also imbalance drum 13B, resulting in shaft vibrations that yield additional stresses on apparatus 12.

These physical changes tend to increase pressure variations and process noise in the pressure signals. By sensing this pressure noise, transmitter/sensor 11 provides a diagnostic tool for monitoring rotary apparatus 12. In particular, the diagnostic tool indicates changes in the physical condition of apparatus 12, including wear and tear due to geometrical changes in blades 14 or vanes 15, and changes in the vibrational state of shaft sections 13A or 13B.

Figure 2:
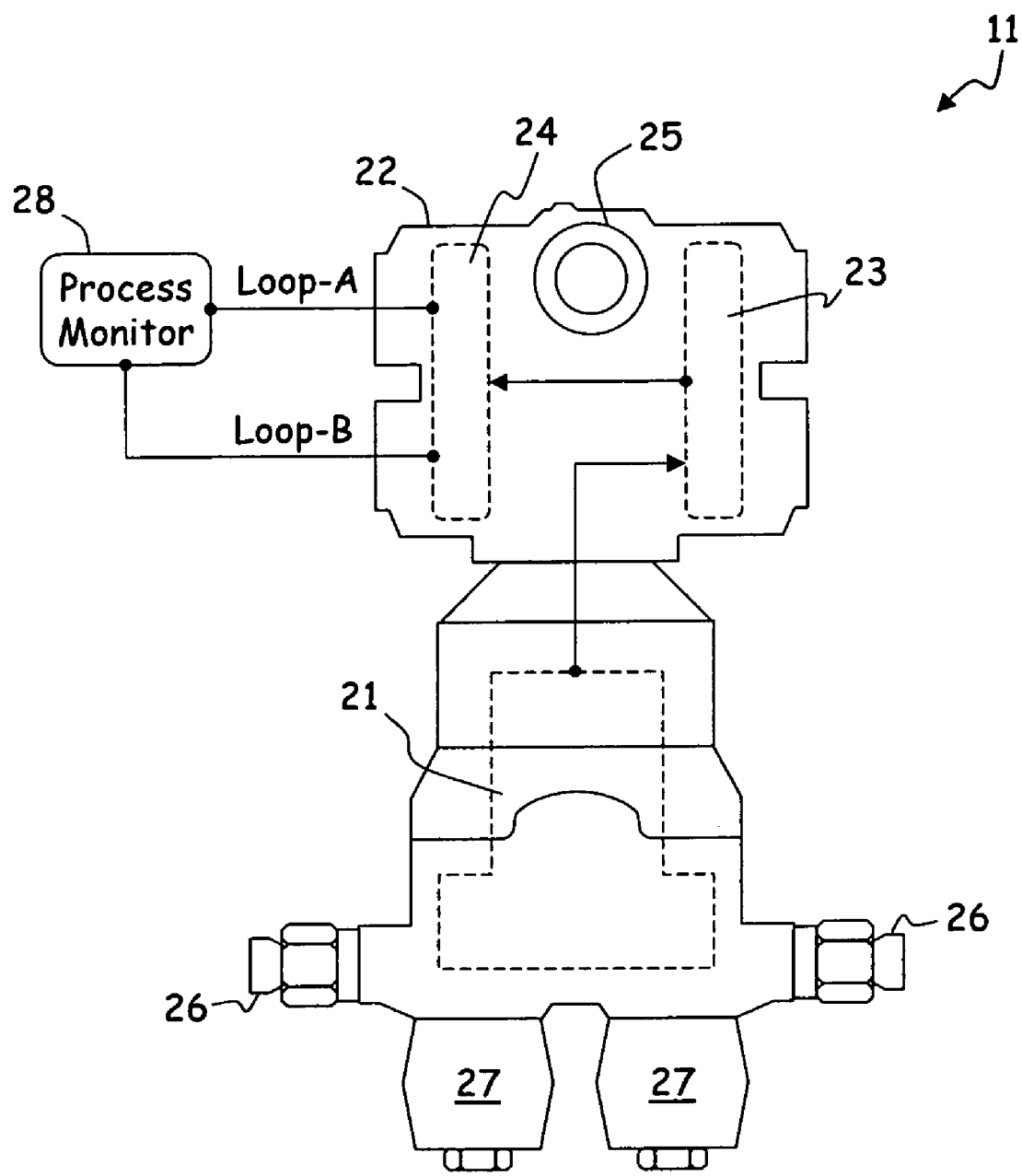
FIG. 2 is a schematic illustration of a pressure sensor/transmitter configured for use in the system of FIG. 1.

FIG. 2 is a schematic illustration of pressure transmitter 11 with pressure sensor module 21, as configured for use in system 10 of FIG. 1. Transmitter 11 comprises housing 22 with internal components including pressure sensor module 21, processor 23 and terminal block 24 (shown with hidden lines).

Sensor module 21 comprises a capacitive pressure sensor, a piezoresistive pressure sensor, a strain gauge, a spring gauge or another pressure-sensitive device configured to generate a pressure signal as a function of a line pressure, a dynamic pressure, a static pressure or other pressure-based fluid parameter, in differential, gage or absolute pressure mode. Sensor 21 is sensitive to process noise and other variations in the pressure signal, as related to physical wear and tear on blades, vanes and other rotary equipment components.

Housing 22 is formed from strong, durable, machinable materials such as aluminum, brass, steel and other metals, PVC plastics, ABS plastics and other durable polymers, and combinations thereof. These are shaped into a number of side walls, end walls, cover plates and other structures, creating an insulating and protective enclosure for pressure sensor 21, processor 23, terminal block 24 and the other internal components of transmitter 11. Typically, housing 22 also forms a pressure seal to prevent the entry of corrosive fluids, explosive gases and other hazardous agents.

Housing 22 provides electrical connections for transmitter 11, for instance via a terminal cover at terminal block 24. In some embodiments, the housing also provides a number of conduit connections 25. The process section of transmitter 11 typically provides bleed valves 26 and process fluid connections at flange adaptor couplings 27, or an alternative coupling structure such as a coupling nut for an impulse tube.

In one illustrative embodiment, housing 22 is configured for a 3051S pressure transmitter, as available from Rosemount Inc. In other embodiments, the specific configuration of housing 22 varies, in order to accommodate a variety of alternate component designs. In further embodiments, one or more components of sensor/transmitter 11 is provided in standalone form, and not contained within the same housing.

Processor 23 comprises a signal processor for generating a process pressure value and a statistical processor for generating a wear diagnostic and a wear indicator, each based on the pressure sensed by primary sensor 21. The signal and statistical processors are sometimes combined into a single microprocessor, and sometimes divided among various circuit components in an electronics stack or electronics assembly, such as a signal processor board and a statistical feature board.

Terminal block 24 is formed from an insulating body and a number of conducting terminals. The terminal block body is typically formed of a durable, machinable polymer such as plastic, and the terminals are typically formed of a conducting metal such as steel, brass or copper.

Terminal block 24 connects transmitter 11 to process monitor/system controller 28 as part of a pressure-based diagnostic system for rotary equipment. In some embodiments, process monitor 28 communicates with a single transmitter 11 via a two-wire loop comprising individual loop wires Loop-A and Loop-B, as shown in FIG. 2. In other embodiments, process monitor 28 communicates with a number of different transmitters 11, either in series or parallel, utilizing any combination of control loops, data cables, data buses and other communications hardware, including infrared (IR), optical, radio-frequency (RF) and other wireless devices such as a Rosemount 1420 gateway.

In two-wire embodiments, communications between process monitor 28 and sensor/transmitter 11 typically utilize a 4-20 mA analog current signal protocol. In some of these embodiments, a series of digital signals are superimposed on the analog current, forming a HART®-based (Highway Addressable Remote Transducer) communications protocol. Alternatively, process monitor 28 utilizes a range of analog, digital, and hybrid signal protocols, including HART®, Foundation™ Fieldbus, PROFI® BUS and PROFI® NET.

In the particular two-wire embodiment of FIG. 2, loop wires Loop-A and Loop-B carry a signal current of approximately four to twenty milliamps (4-20 mA), and provide a maximum operating voltage between approximately twelve and thirty volts (12-30V, or from 10.5 V to 55 V with no load). The loop current is used both for process communications with process monitor 28, and also to provide power to transmitter 11.

The nominal signal offset of about 4 mA provides a continuity test for the current loop, and reserves a dedicated power supply current of about 3 mA. At typical operating voltages, this limits transmitter operating power to about 18-36 mW or less. Alternatively, the offset is between five and ten milliamps (5-10 mA), and the operational power limit is about 50 mA or less. In these low-power embodiments, transmitter 11 requires less than one percent of the power rating of a typical incandescent nightlight.

Figure 3:
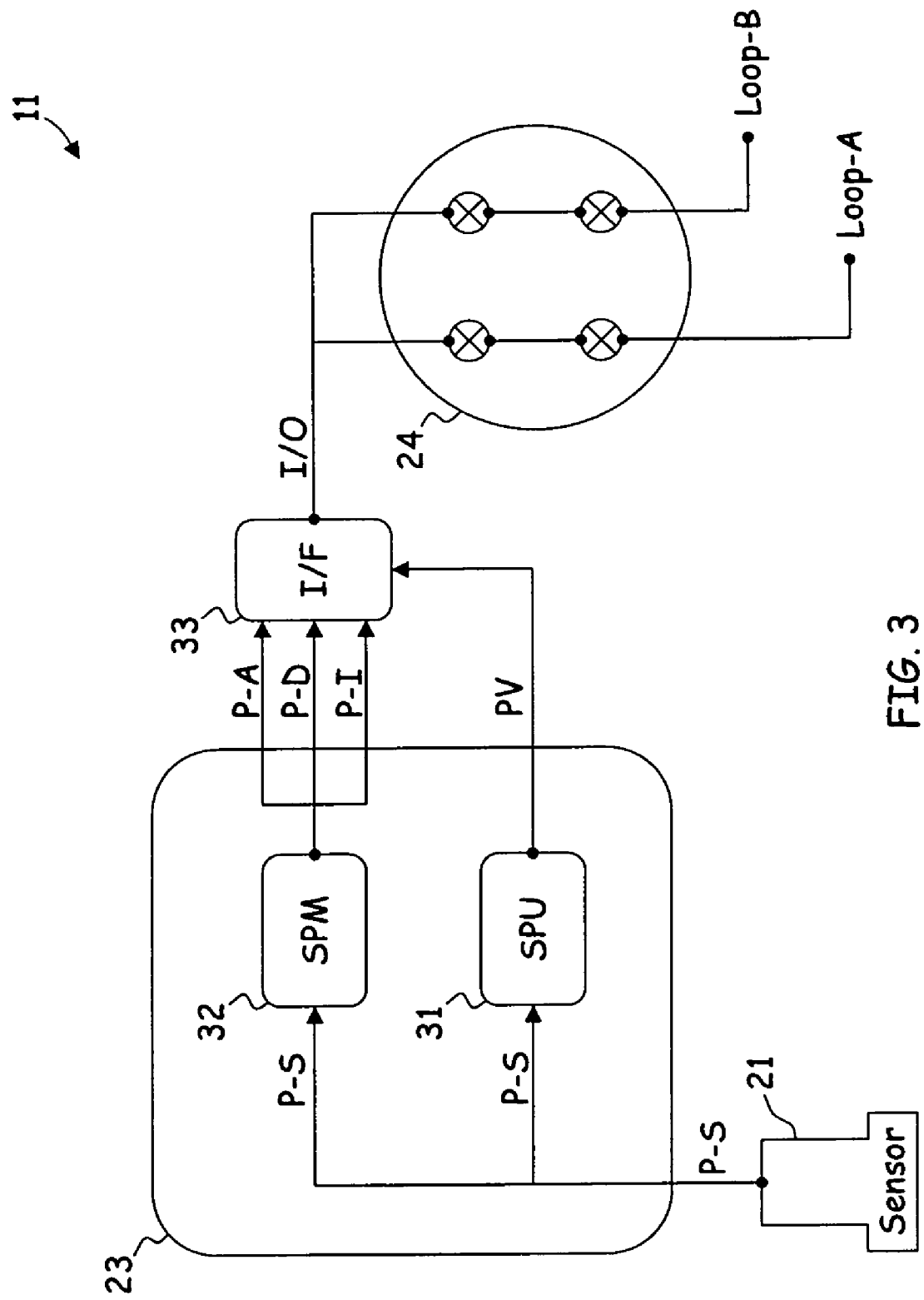
FIG. 3 is a schematic diagram of the pressure sensor in FIG. 2, illustrating one possible signal processing configuration.

FIG. 3 is a schematic diagram of pressure sensor 21 as embodied in transmitter 11, illustrating one possible signal processing configuration. In particular, FIG. 3 illustrates signal connections between primary sensor module 21 and processor 23, including signal processor 31 and statistical processor 32, and among processor 23, interface 33 and terminal block 24.

Typically, transmitter 11 also comprises a controller for configuring, zeroing or calibrating the transmitter, but controller signals are not shown in FIG. 3. In other embodiments, pressure sensor 21, processor 23 and interface 33 are standalone components not comprised within a transmitter, as described, for example, with respect to FIG. 7, below.

Primary sensor module 21 generates sensor signal P-S as a function of thermodynamic contact with a process fluid. In some embodiments, primary sensor module 21 first generates a continuous analog sensor signal, such as an analog voltage from a capacitive pressure sensor or an analog current from a piezoresistive pressure sensor. The analog signal is digitized by clocking an analog-to-digital (A/D) converter (or ADC), such that P-S comprises a series of digital signals. In other embodiments, P-S is delivered to processor 23 as an analog signal, and is digitized by one or more processor components.

Pressure signals P-S represent the pressure measured by primary sensor module 21. This pressure has two components: an average (or mean) pressure and process pressure noise, which varies or fluctuates about the average. The average pressure generally changes on a relatively long time scale, as compared to the rotational period of the rotary equipment operating on the fluid. Process pressure noise, on the other hand, typically varies on a much shorter time scale, due to the effect of blades, vanes and other components that operate on the fluid with high relative rotational speeds. There are also independent signal noise effects, which are generally aperiodic in nature and governed by unrelated time scales.

Signal processor (SPU) 31 generates process pressure PV (the primary process variable) by calculating a running average of a number of digital sensor signals P-S, or by integrating an analog pressure signal. In some embodiments, process pressure PV is generated in arbitrary units, and in other embodiments PV is a calibrated in standard pressure units such as Pascals or inches of water. In some of these embodiments, transmitter 11 comprises a temperature sensor, which is used to provide temperature compensation for process pressure PV.

In the embodiment of FIG. 3, statistical processor module (SPM) 32 generates three different outputs. These are mean pressure P-A, wear diagnostic P-D and wear indicator P-I. Average pressure P-A represents mean pressure <P>, as calculated over a series of pressure signals P-S. Wear diagnostic (or statistical diagnostic) P-D is a statistical function of the pressure signals, and indicates the degree of wear on components of the rotary apparatus. Wear indicator P-I functions as a warning or alarm/alert output, which selectively indicates certain wear conditions based on changes in wear diagnostic P-D.

The relationship between wear diagnostic P-D and the physical condition of rotary equipment components such as blades, vanes and shafts is determined from a combination of empirical data and engineering. When the physical conditions of the rotary apparatus change, it is reflected in wear diagnostic P-D, such as an increase above a threshold value or an increase above a threshold slope. This allows wear indicator P-I to be raised, based on the change in wear diagnostic P-D, indicating the need for a maintenance action such as an inspection or a shut-down for replacement and repair.

Signal processor (SPU) 31 communicates process pressure PV to input/output interface (I/F) 33. Interface 33 generates a corresponding process output for a process monitor or system controller, for example an analog current transmitted over loop wires Loop-A and Loop-B via terminal block 24. Similarly, SPM 32 communicates average pressure P-A, wear diagnostic P-D and wear indicator P-I to interface 33, and interface 33 generates additional corresponding process outputs, for example digital signals superimposed on the analog current. Alternative analog and digital communication protocols are also utilized, as described above.

The data rates for process pressure PV and SPM outputs P-A, P-D and P-I are limited by the sampling and integration times of sensor 21 and associated A/D converter components, and by the computational capabilities of signal processor (SPU) 31 and statistical processor (SPM) 32. These capabilities, in turn, are limited by the total power available to transmitter 11, which is determined by the power supply current.

Process variables such as PV are typically updated on a substantially continuous basis, based on the sampling period of sensor 21 and the processing time for SPU 31. In some embodiments, the sampling period is between about one tenth of a second and one second (about 0.1-1.0 s), corresponding to a sampling rate between about one and ten Hertz (about 1-10 Hz). In other embodiments, the sampling period is between about forty milliseconds and about one hundred milliseconds (about 40-100 ms), corresponding to a sampling rate between about ten and twenty-five Hertz (10-25 Hz). In one of these embodiments, the sampling period is about forty-five milliseconds (45 ms), corresponding to a sampling frequency of about twenty-two point two Hertz (22.2 Hz).

Diagnostic outputs from SPM 32 are updated on a periodic basis. In some embodiments, the output rate for average pressure P-A, diagnostic P-D and indicator P-I is between about a tenth of a Hertz and about one Hertz (0.1-1.0 Hz), corresponding to a diagnostic period of about one to ten seconds (1-10 s). In one of these embodiments, the diagnostic output rate is about one Hertz (1 Hz), corresponding to a diagnostic period of about one second (1 s).

Pressure signals P-S from sensor module 21 are subject to both mechanical and electronic damping. Mechanical damping includes external damping in impulse tubing and related pressure coupling structures, and internal damping within transmitter 11 itself, for example in an oil-filled three-spring pressure coupling mechanism. Mechanical damping tends to reduce the effects of higher-frequency pressure signals, but sensor 21 remains sensitive to these signals in the form of process noise on the pressure signal, particularly when associated with the operation of rotary equipment.

Electronic damping is typically achieved via filter circuitry in sensor 21, which shapes pressure signal P-S. In some embodiments, electronic damping is also provided by signal processor (SPU) 31, but this depends upon transmitter and sensor configuration. In further embodiments statistical processor (SPM) 32 also provides electronic damping, but the SPM outputs are also highly dependent on sampling effects such as aliasing and beat-related signals. These effects complicate the problem of pressure-based wear diagnostics, particularly when the relevant rotational frequency approaches or exceeds the sampling rate.

Figure 4A:
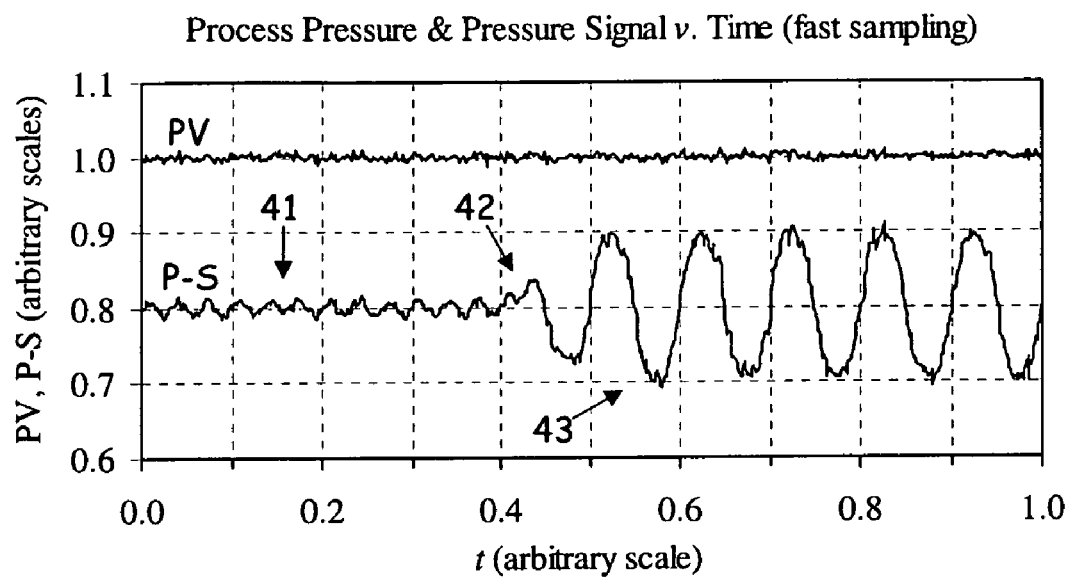
FIG. 4A is a plot of process pressure and pressure signal versus time, with idealized (fast) pressure sampling.

FIG. 4A is a representative plot of process pressure PV and pressure signal P-S versus time, with idealized (fast) pressure sampling. Process pressure PV and pressure signal P-S both appear on the vertical axis, with time in arbitrary units along the horizontal. Process pressure PV varies about a normalized and dimensionless value of one. This falls above the range of pressure signals P-S, but they are not necessarily measured in the same units and in any case the vertical scale is arbitrary.

In general, stability requires that process variables be relatively constant over short time scales, in order to avoid overcorrection and oscillations due to feedback. Process pressure PV is thus both mechanically and electronically damped, as described above, with typical signal noise (or error) on the order of a few tenths of a percent or less. Process pressure PV is not typically sensitive to wear-related process noise effects.

Individual pressure signals P-S are not subject to the same damping as process pressure PV, and are more sensitive to process-related noise. With fast (idealized) sampling as in FIG. 4A, individual blade passing events in initial region 41 can be resolved as a periodic and substantially sinusoidal function, with frequency at the blade passing frequency (BPF). There is also a random signal noise component, unrelated to the BPF, appearing on top of the sinusoidal.

At transition 42, a second term appears due to damage to a particular blade or vane. The damage occurs on a relatively short time scale, such as the relatively rapid or discrete loss of an area of blade coating or blade tip, rather than the longer time scale characteristic of more gradual erosion. As this damage occurs, a second process-related noise signal appears at the rotational frequency, which is the rate at which the single (damaged) blade passes the sensor. The resulting waveform in post-event region 43 is dominated by the new primary signal, but also shows the original BPF.

In this particular example the BPF is three times the primary frequency, indicating that there are three individual blades. In other embodiments there are two blades, or four or more blades. Many turbine and compressor designs, for example, utilize dozens of blades for each individual stage.

Unfortunately, the idealized resolution of FIG. 4A is not typically achieved in actual process monitoring applications, particularly in low-power sensor environments. Instead, the sampling rate is generally less than the rotational frequency, and generally much less than the BPF. As a result, individual blade signals are not resolved, so blade wear and other physical changes in the rotary equipment components must be monitored via statistical means.

Figure 4B:
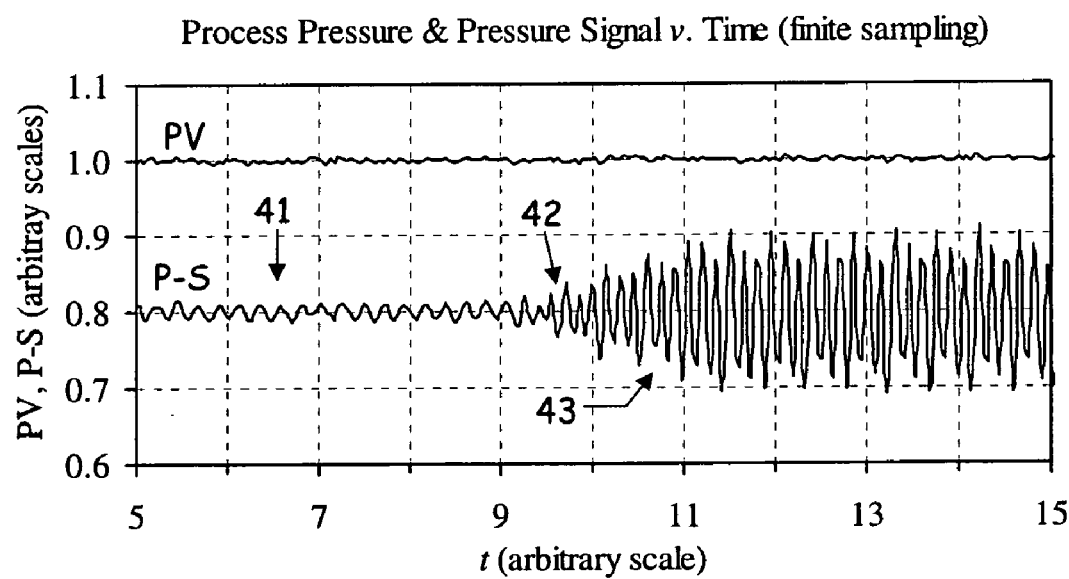
FIG. 4B is an alternate plot of process pressure and pressure signal versus time, with realistic (finite) pressure sampling.

FIG. 4B is an alternate representational plot of process pressure PV and pressure signal P-S versus time, with more realistic (finite) sampling. Time is on the horizontal axis with process pressure PV and pressure signals P-S on the vertical, each in arbitrary units as described above for FIG. 4A. In contrast to FIG. 4A, however, FIG. 4B illustrates a number of sampling effects due to the lower sampling rate.

In general, periodic signals are not fully resolved when the sampling rate fails to satisfy the Nyquist relation, which requires that the sampling frequency be at least twice the signal frequency:

$$f_S \geq 2f. \quad [1]$$

When sampling frequency $f_S$ is less than twice signal frequency f (that is, when Eq. 1 is not satisfied), the signal frequency is not uniquely resolved. In this case, the signal waveform of initial region 41 no longer occurs at the BPF but instead is instead aliased to a lower frequency, or, in some cases, may disappear altogether. Similar effects occur when the Nyquist relation is only minimally satisfied (for example, when the sampling frequency is less than four times the relevant rotational frequency), and the processing time is insufficient to resolve beat effects between the sampling rate and the signal.

Aliasing depends upon differences between the signal frequency and harmonics of the sampling rate. Specifically, aliasing occurs at frequencies $f_A$ that satisfy $$f_A = |f - N \times f_S|, \quad [2]$$

where N is the order of the sampling frequency harmonic. In principle, Eq. 2 indicates that a single primary frequency can be aliased to a number of different harmonic orders. In practice, however, the analysis typically yields stronger signals at lower aliasing frequencies, emphasizing the nearest harmonics of sampling frequency $f_S$.

In both FIG. 4A and FIG. 4B, the time scales are arbitrary and not limited to any particular sampling period, blade passing frequency, or other characteristic time scale. In one particular embodiment, however, the sampling period is about forty-five milliseconds (45 ms), corresponding a sampling rate of 22.2 Hz. For a rotational frequency of 3,600 rpm, the corresponding BPF (for three blades) is 180 Hz, and the passing frequency of a single (damaged) blade is 60 Hz. In this example, the relevant harmonic of sampling frequency $f_A$ is the eighth (N=8), which yields a beat frequency of 2.4 Hz (180 Hz−8×22.2 Hz=2.4 Hz).

Sampling effects are highly system dependent, however, and difficult to generalize because the behavior of any particular pressure device is hard to predict. Given a finite analysis window, for instance, the aliased signal is likely to appear at a relatively low-integer fraction of the sampling frequency, rather than any of the actual solutions given by Eq. 2. This is the case, for example, in FIG. 4B, where the BPF signal appears at approximately 2.22 Hz (that is, at one tenth of the sampling frequency), rather than at the nominal beat frequency of 2.4 Hz.

At transition 42, blade damage occurs and a new signal appears in post-event region 43. The signal frequency is 60 Hz, which is one-third the BPF (that is, new signal frequency is the passing frequency for the damaged blade). This signal is not resolved, because the Nyquist condition is still not met. Instead, the signal is aliased to 6.6 Hz, based on the third harmonic of sampling frequency $f_S$ (that is, |60 Hz−3×22.2

Hz|=6.6 Hz.) The dominant signal actually appears at 6.66 Hz, however, which is three tenths of the sampling frequency.

As the signal frequency increases above half the sampling frequency, results become increasingly unpredictable. When the signal frequency increases above about ten times the sampling frequency, the lowest beat frequency often decreases below one Hertz and the signal typically washes out due to the finite analysis time and the effects of relatively unstable signals "wandering" across frequencies, as is characteristic of imbalanced rotational systems. Damaged blades and vanes also tend to produce highly variable pressure signals, making it difficult to resolve individual contributions. In addition, wear signals can occur either at the BPF or the rotational frequency, or both, depending on where the damage occurs and how the individual blades, vanes and other components interact.

This makes it difficult to generate useful results without faster sampling and more computationally-intensive methods, such as vector analysis or Fourier-based transforms. Unfortunately, these methods are not generally available in low-power transmitter environments, and increased processing time necessarily reduces response. Nonetheless, under some operational conditions useful pressure diagnostics can be generated based on process noise and other pressure variations, even when the signal frequency approaches or exceeds the sampling rate.

Some statistical pressure diagnostics that require less computational power include the standard or root-mean-square (rms) deviation of the pressure ($\sigma$) and the coefficient of variation ($c_v$), which is the standard deviation divided by the mean. Thus the coefficient of variation is essentially the inverse of the signal-to-noise ratio (or "noise-to-signal" ratio) of the pressure signal:

$$c_v = \frac{\sigma}{\langle P \rangle}. \qquad [3]$$

In general, mean differential pressure $\langle \Delta P \rangle$ is determined over a series of digital pressure signals, or by integrating an analog pressure signal. Standard (or rms) deviation $\sigma$ is calculated over the same data set, and includes both random signal noise and wear-related effects.

Statistical diagnostics do not provide the same degree of information about the original pressure signal as more computational forms like the Fourier transform, and correlations with actual wear conditions require precision measurements under highly variable process conditions. Best practices teach that this precision is difficult to achieve, and when the rotational frequency exceeds the sampling rate, aliasing and other unpredictable effects make the results uncertain. Nonetheless, under certain operating conditions process noise-based diagnostics such as the standard deviation can be effectively correlated with changes in the physical condition of particular rotary equipment components, including wear-related effects.

Figure 5:
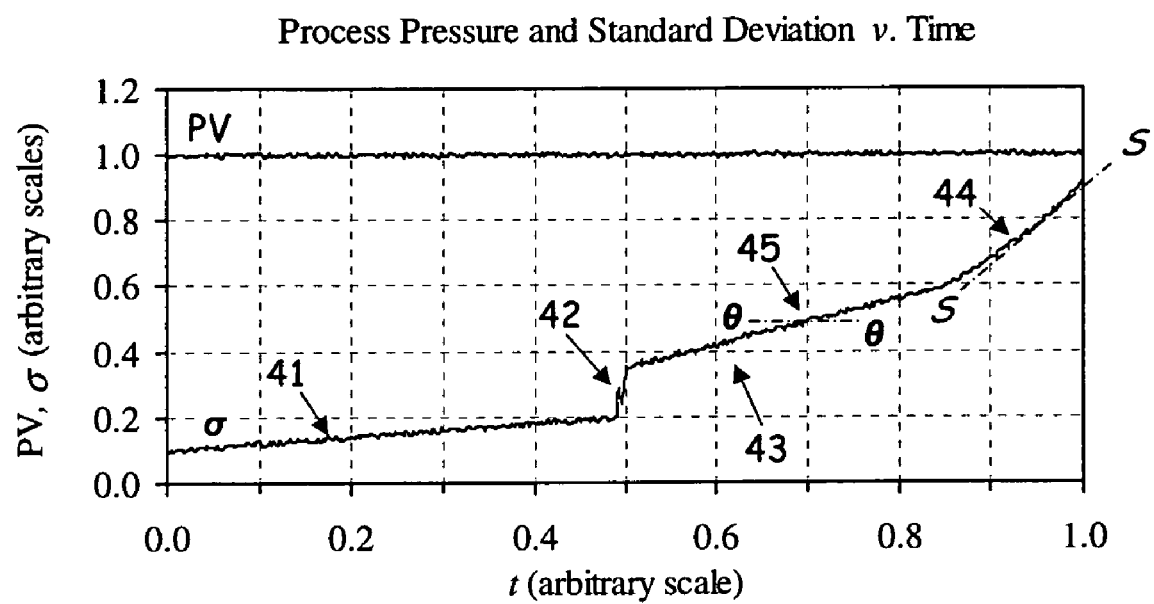
FIG. 5 is a plot of the standard deviation of a pressure signal versus time, showing representative correlations with various wear effects.

FIG. 5 is a plot of the standard deviation of a pressure signal versus time, showing representative correlations with various wear effects. Process pressure PV and standard deviation $\sigma$ appear on the vertical axis, scaled in arbitrary with mean pressure $\langle P \rangle$ normalized to one.

The time scale in FIG. 5 is also arbitrary, but corresponds generally to a maintenance time scale of minutes, hours, days, months or years. This contrasts with FIGS. 4A and 4B, where the time scale is more representative of rotational periods on the order of seconds or less.

In contrast to process pressure output PV, which is generated as a stable output, the standard or rms deviation ($\sigma$) is a representative wear diagnostic that is sensitive to a range of physical changes in rotary components, including blades and vane erosion, impact-induced deformations, partial or full liberation events, shaft vibrations and drum imbalances. These correlations apply to other noise-based diagnostics as well, including the mean square deviation ($\sigma^2$) and coefficient of variation ($c_v$), which are functionally related to the rms deviation.

In initial region 41 of the plot, for example, the value of the wear diagnostic increases approximately linearly. This corresponds to a relatively slow and monotonic increase in the noise, which is expected from gradual blade and vane erosion in hot or corrosive fluids, in fluids having a high particulate content, and in steam flows having a relatively small condensed water component.

At transition 42, the diagnostic increases substantially over a relatively short time scale. This is characteristic of a partial liberation, deformation, or other impact-induced event, in which the physical shape of a particular blade or vane changes on an essentially discrete time scale. Typically, this increases non-uniformities in flow, increasing pressure noise as represented in the coefficient of variation.

In post-event region 43, the diagnostic increases along a substantially linear profile. Here, the slope is greater than in initial region 41, indicative of higher blade stresses due to the prior damaging event. Ultimately, the plot enters divergent region 44, where cumulative damage has created shaft vibrations or other progressive effects, and the diagnostic increases rapidly until failure occurs.

In some embodiments, a wear indicator or alert is generated as a function of changes in the diagnostic, indicating the need for maintenance action. In the case of relatively normal wear and tear, for example, a simple threshold function is sometimes used, such as when the diagnostic crosses alarm threshold $\theta$ at crossover 45. In other embodiments, the indicator is based on a slope of the diagnostic function, for example where the slope approaches a high or divergent value at transition 42, or when the slope crosses threshold slope S in divergent region 44.

Figure 6:
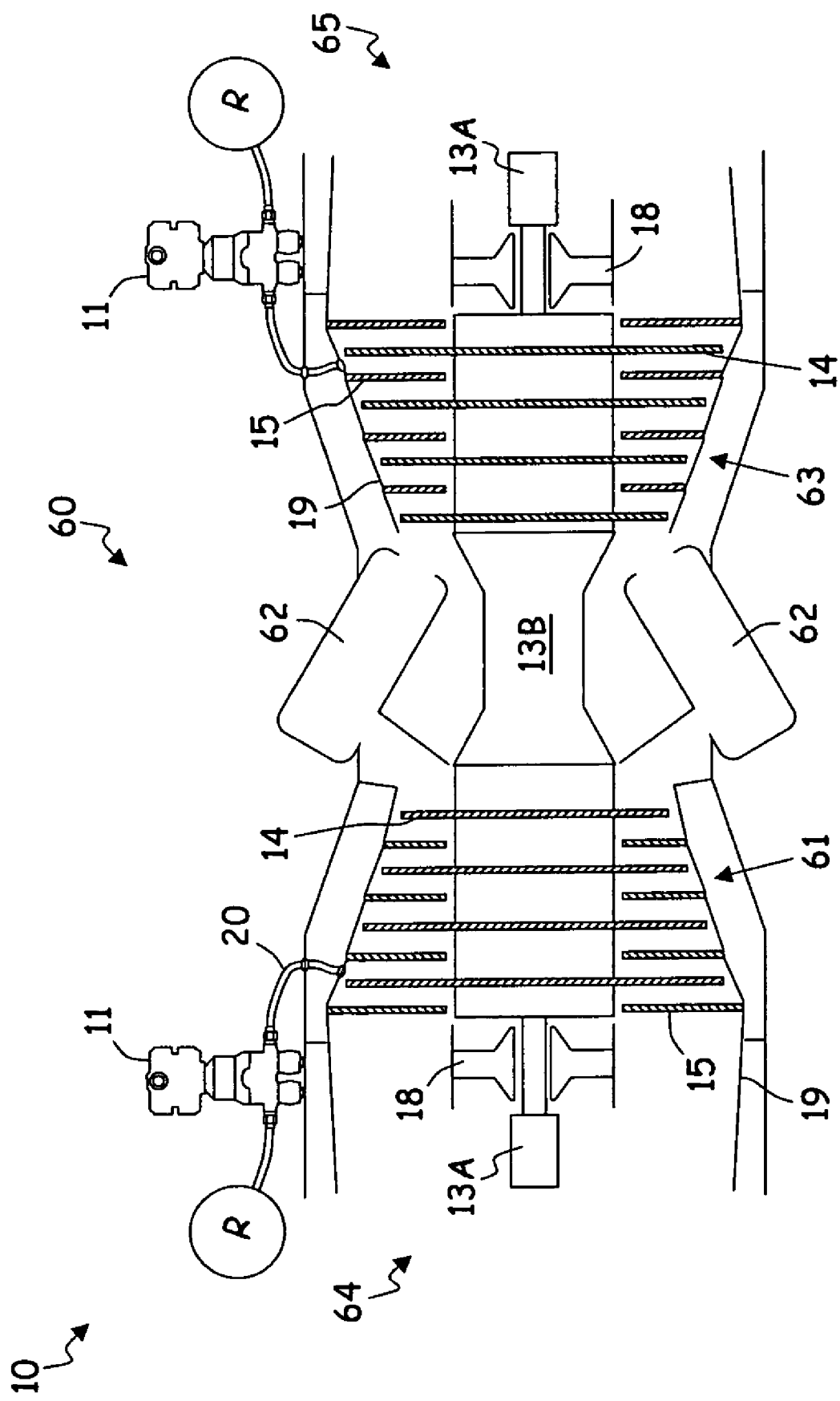
FIG. 6 is a cross-sectional schematic of the pressure-based diagnostic system in FIG. 1, as applied to an axial-flow gas turbine engine.

FIG. 6 is a cross-sectional schematic of pressure-based diagnostic system 10, as applied to axial-flow gas turbine engine 60. Gas turbine engine 60 comprises compressor section 61, shaft sections 13A and 13B, combustors 62 and turbine section 63. Compressor 61, combustors 62 and turbine 63 are coaxially oriented about shaft sections 13A and 13B, and arranged in flow series with upstream engine inlet 64 and downstream exhaust 65.

Output shaft sections 13A are supported by bearings 18, and mechanically coupled to drum/spool section 13B. Rotating blades 14 are mounted to spool 13B in forward (compressor) section 61 and aft (turbine) section 63. Stationary vanes 15 are similarly mounted to the compressor (forward) and turbine (aft) sections of turbine/engine case 19, forming a number of alternating compressor and turbine stages. These elements are constructed analogously to the shaft, blade and vane components of turbine system 10, as described above with respect to FIG. 1.

Air enters gas turbine engine 60 at engine inlet 64. Compressor 61 compresses the air from inlet 64 for use as an oxidant in combustors 62, where it is mixed with fuel and ignited to produce hot combustion gases. The combustion gases drive turbine 63 and exit via exhaust 65. Shaft spool 13B couples turbine 63 to compressor 61, which drives the compressor section, and to output shafts 13A, which deliver rotational energy to a mechanical load such as an electrical generator or rotary drive train.

In some embodiments, a number of coaxially nested compressor/turbine spools are utilized, each operating at different pressures and rotational speeds in order to improve efficiency. In these embodiments, different output shafts 13A are sometimes coupled to one or more spools via a gearbox, for example to drive ground-based electrical generators. Alternatively, individual spools are used to drive a number of different mechanical loads. In aviation embodiments, for example, exhaust 65 is typically formed as a nozzle in order to generate thrust from the hot combustion gases, and coaxially nested spools are used to drive compressor 63 and an upstream turbofan, and to provide power for accessory functions such as hydraulics and environmental control.

Transmitters 11 comprise pressure sensors positioned to monitor or sample pressure at various locations along the fluid path through gas turbine engine 60, such as at compressor 61 and turbine 63. Transmitter/sensors 11 generate wear diagnostics as a function of pressure variations and process noise, and the diagnostics are indicative of the operational condition of gas turbine engine 60. In particular, the diagnostics are correlated with physical changes in blades 14 and vanes 15 including erosion, corrosion and impact-related events, and correlated with vibration-inducing asymmetries in shaft drum 13B.

Figure 7:
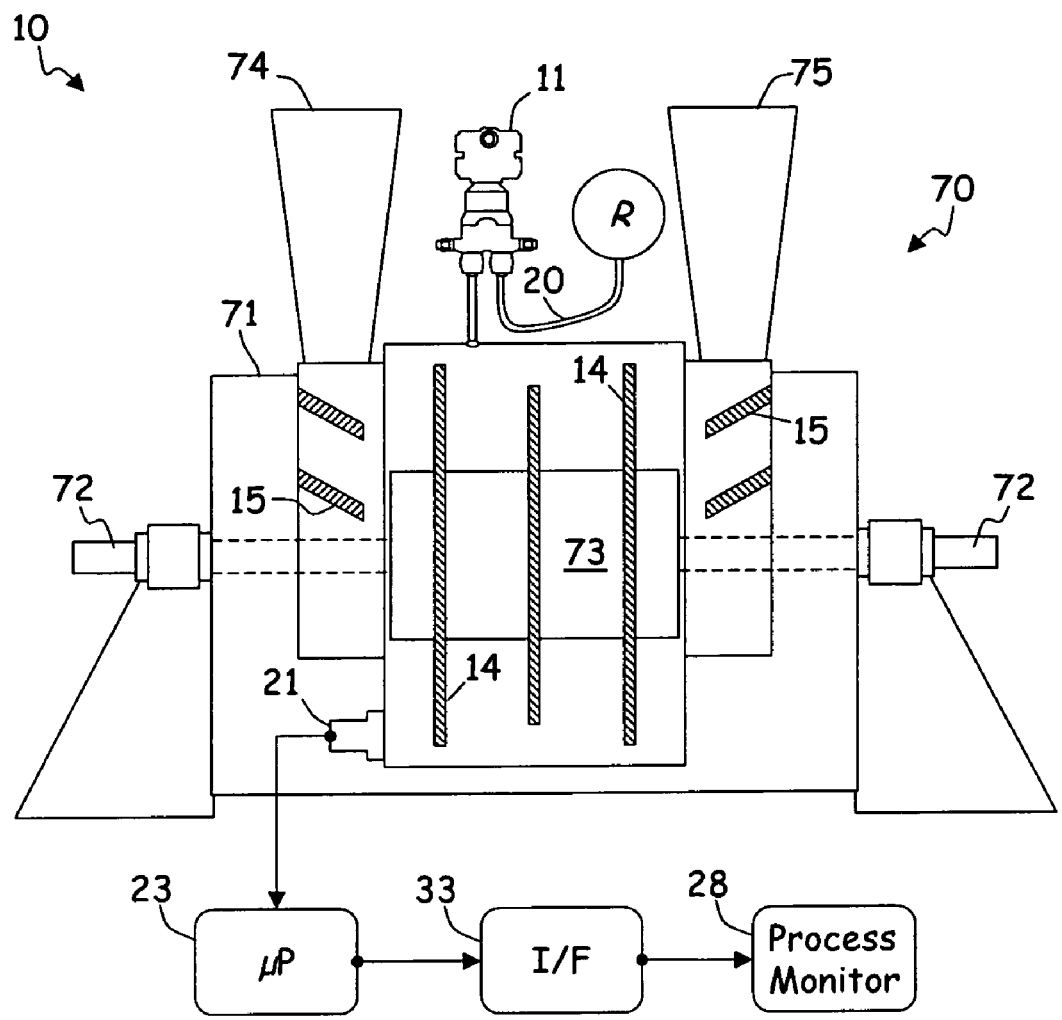
FIG. 7 is a cross-sectional schematic of the pressure-based diagnostic system in FIG. 1, as applied to a blower.

FIG. 7 is a cross-sectional schematic of pressure-based diagnostic system 10, as applied to blower 70. Blower 70 comprises housing 71, drive shaft 72 coupled to hub 73, and fan blades 14.

In the particular embodiment of FIG. 7, blower 70 comprises a primary coal pulverizer fan. In this embodiment, a fluidic stream of pulverized coal and air (or other oxidizer) enters blower 70 at inlet 74, passes across fan blades 14 and exits at outlet 75. In other embodiments, blower 70 comprises a fan for a furnace, chiller, or more generalized HVAC (heating, ventilation and air conditioning) apparatus.

In the pulverizer embodiment of FIG. 7, drive shaft 72 is coupled to a motor (not shown), which drives hub or drum section 73. Fan blades 14 are arranged onto drum/hub 73 in a number of stages, in order to efficiently drive a fluidic pulverized coal/oxidant mixture through blower 70. In some embodiments, a number of guide vanes 15 are also utilized, to help direct flow across blades 14 from inlet 74 to outlet 75.

FIG. 7 shows one sensor module 21 directly coupled to blower 70, absent a transmitter housing, with processor 23 and interface 33 provided either as distinct (standalone) components, or comprised within process monitor/system controller 28. Another sensor is provided within pressure sensor/transmitter 11, which incorporates these other components as described above, and is coupled to blower 70 via impulse tubing 20. Each of these sensors is positioned to monitor process noise by sampling pressure in the fluid flow processed by blower 70, and to diagnose the operational condition of rotary components such as drum/hub 73 and fan blades 14. In particular, sensor 21 and sensor/transmitter 11 monitor pressure noise in order to diagnose wear and tear on the components of blower 70 due to abrasion in the pulverizer flow, and to indicate the need for maintenance actions when noise-based diagnostics exceed selected threshold or slope values.

Although the present invention has been described with reference to preferred embodiments, the terminology used is for the purposes of description, not limitation. Workers skilled in the art will recognize that changes may be made in form and detail without departing from the spirit and scope of the invention.

The invention claimed is:

1. A system comprising:
   a rotary apparatus having a component for operating on a working fluid, the component comprising a turbine, a compressor, a fan, a turbofan or a blower;
   a sensor that senses a working fluid pressure of the rotary apparatus and monitors process noise on the working fluid pressure; and
   a processor that monitors process noise on the working fluid pressure and generates a wear diagnostic indicative of wear on the component as a function of the process pressure noise;
   wherein the wear diagnostic is correlated with a physical change in the component of the rotary apparatus; and
   wherein the physical change is due to damaging interaction with the working fluid.

2. The system of claim 1, wherein the sensor has a sampling frequency that is less than twice a rotational frequency of the rotary machine.

3. The system of claim 2, wherein the sampling frequency is less than the rotational frequency.

4. The system of claim 2, wherein the sampling frequency is greater than 20 Hz.

5. The system of claim 1, wherein the component comprises a blade or a vane, the blade or vane having an airfoil-shaped cross section.

6. The system of claim 5, wherein the rotary machine comprises a gas turbine engine for rotating the blade or vane.

7. The system of claim 1, wherein the diagnostic comprises a standard deviation of the process pressure noise.

8. The system of claim 1, wherein the processor further generates a wear indicator based on a change in the diagnostic.

9. The system of claim 1, wherein the processor further generates a process pressure value based on process pressure in the fluid.

10. The system of claim 1, further comprising an interface for transmitting the process pressure value and the diagnostic over a loop wire, wherein the loop wire has a maximum current of about 20 mA or less.

11. A method comprising:
    sensing a working fluid pressure of a rotary apparatus having a component operating on the working fluid, the component comprising a turbine, a compressor, a fan, a turbofan or a blower;
    monitoring process noise on the working fluid pressure; and
    generating a wear diagnostic as a function of the process noise, such that the wear diagnostic is correlated with a physical change in the component of the rotary apparatus, wherein the physical change is due to damaging interaction with the working fluid.

12. The method of claim 11, wherein sensing the working fluid pressure is performed at less than twice a rotational frequency of the rotary equipment.

13. The method of claim 11, wherein monitoring process noise on the working fluid pressure comprises monitoring a standard deviation of the working fluid pressure.

14. The method of claim 11, further comprising generating a wear indicator when the wear diagnostic exceeds a threshold value.

15. The method of claim 11, further comprising generating a wear indicator when a slope of the wear diagnostic exceeds a threshold value.

16. The method of claim 11, wherein the physical change in the component comprises wear on at least one of a blade or a vane, the blade or vane having an airfoil-shaped cross section.

17. The method of claim 16, wherein the physical change in the component comprises abrasion, erosion, pitting, corrosion, deformation or liberation of at least part of the blade or vane.

18. The method of claim 16, wherein the wear diagnostic is further correlated with water content in a steam flow.

19. The method of claim 16, wherein the wear diagnostic is further correlated with particulate content in a pulverized coal flow.

20. The method of claim 11, further comprising transmitting the working fluid pressure and the wear diagnostic over a loop wire having a maximum current of about 20 mA or less.

21. A diagnostic pressure transmitter comprising:
- a sensor that senses a working fluid pressure of a rotary apparatus having a rotary component operating on the working fluid, the rotary component comprising a blade or vane of a turbine, a compressor, a fan, a turbofan or a blower;
- a processor that monitors process noise on the working fluid pressure, generates a wear diagnostic as a function of the process noise, and generates a wear indicator as a function of a change in the wear diagnostic; and
- an interface for transmitting the wear diagnostic and the wear indicator to a monitoring system;
- wherein the wear diagnostic is correlated with a physical change in the rotary component of the rotary apparatus;
- wherein the physical change is due to damaging interaction with the working fluid; and
- wherein the wear indicator is indicative of abrasion, erosion, pitting, corrosion, deformation or liberation of an airfoil section of the blade or vane.

22. The transmitter of claim 20, wherein the sensor has a sampling period greater than a rotational period of the rotary equipment.

23. The transmitter of claim 21, wherein the sampling period is greater than 20 Hz.

24. The transmitter of claim 20, wherein the wear diagnostic comprises a standard deviation of the pressure noise.

25. The transmitter of claim 20, wherein the transmitter operates on no more than 50 mW of power.

* * * * *